(12) United States Patent
Greenberg et al.

(10) Patent No.: US 10,865,715 B2
(45) Date of Patent: Dec. 15, 2020

(54) PASSIVE STABILITY BLEED VALVE WITH ADJUSTABLE REFERENCE PRESSURE REGULATOR AND REMOTE OVERRIDE CAPABILITY

(71) Applicant: United Technologies Corporation, Farmington, CT (US)

(72) Inventors: Michael D. Greenberg, Bloomfield, CT (US); Robert B. Goodman, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 224 days.

(21) Appl. No.: 16/213,381

(22) Filed: Dec. 7, 2018

(65) Prior Publication Data

US 2020/0182161 A1 Jun. 11, 2020

(51) Int. Cl.
*F02C 9/18* (2006.01)
(52) U.S. Cl.
CPC .......... *F02C 9/18* (2013.01); *F05D 2220/323* (2013.01); *F05D 2270/101* (2013.01); *Y10T 137/3421* (2015.04)
(58) Field of Classification Search
CPC ............................ F02C 9/18; Y10T 137/3421
See application file for complete search history.

(56) References Cited

U.S. PATENT DOCUMENTS

| 3,750,693 | A | * | 8/1973 | Hardison | F16K 1/12 137/219 |
| 3,865,128 | A | * | 2/1975 | Zadoo | G05D 16/106 137/220 |
| 3,963,044 | A | * | 6/1976 | Brown | F16K 31/363 137/490 |
| 3,972,448 | A | * | 8/1976 | Brown | F16K 31/363 222/14 |
| 4,610,265 | A | * | 9/1986 | Nelson | F16K 1/126 137/219 |
| 4,815,285 | A | | 3/1989 | Martin | |
| 5,540,252 | A | * | 7/1996 | Bruun | G05D 7/0146 137/220 |
| 6,446,657 | B1 | * | 9/2002 | Dziorny | F01D 17/105 137/219 |
| 6,557,400 | B2 | | 5/2003 | Xiong et al. | |
| 7,104,282 | B2 | | 9/2006 | Hooker et al. | |
| 9,689,315 | B2 | * | 6/2017 | Marocchini | F01D 17/105 |
| 9,784,184 | B2 | * | 10/2017 | Marocchini | F01D 17/105 |
| 2005/0019156 | A1 | | 1/2005 | D Angelo | |
| 2018/0163892 | A1 | | 6/2018 | Carpignano | |

* cited by examiner

*Primary Examiner* — Kevin R Barss
(74) *Attorney, Agent, or Firm* — Getz Balich LLC

(57) ABSTRACT

A bleed air valve comprises a housing that includes an inlet, an outlet, and a center portion to selectively provide a pneumatic flow path between the inlet and the outlet. A piston moves along a center guide in response to forces applied to the piston, where the piston is spring biased to an open position. The valve also comprises a pressure regulator valve that comprises a spring loaded poppet valve that includes a pressure regulator inlet that receives an inlet pressure which is regulated based upon force applied to a pressure regulator piston. A valve spring applies a force to the piston first surface to spring bias the bleed air valve to the open position. A solenoid valve receives a command signal and in response provides compressed air to a solenoid valve outlet that is in fluid communication with the pressure regulator inlet.

14 Claims, 3 Drawing Sheets

PASSIVE STABILITY BLEED VALVE WITH ADJUSTABLE REFERENCE PRESSURE REGULATOR AND REMOTE OVERRIDE CAPABILITY

BACKGROUND OF THE INVENTION

1. Technical Field

The present disclosure relates to air valves, and more particularly, to an inline bleed air valve for a gas turbine engine.

2. Background Information

Gas turbine engines, such as those that power modern commercial and military aircraft, generally include a compressor section to pressurize and create airflow to feed a combustor section to burn a hydrocarbon fuel in the presence of the pressurized air, and a turbine section to extract energy from the resultant combustion gases.

Stability bleed valves are commonly used in traditional and geared turbofan engines primarily during engine start to prevent compressor surge. The valves are also used for low power stability and stall recovery. Stability bleed valves are typically poppet valves, which are spring loaded open and gradually close, via a pressure force acting on the poppet as the engine speeds up during start. Poppet valves vent the compressed air overboard.

There is a need for an improved stability bleed valve to accommodate engine start as well as stability and stall recovery.

SUMMARY OF THE DISCLOSURE

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the invention are directed to a bleed air valve. The valve comprises a housing that includes an inlet at a first end, an outlet at a second end, and a center portion between the inlet and the outlet to selectively provide a pneumatic flow path between the inlet and the outlet via a passage in the center portion. A piston moves along a center guide, where the piston includes a first piston surface and an opposing second piston surface, and the piston moves along the center guide in response to forces applied to the first piston surface and the second piston surface, where the piston is spring biased to an open position such that the inlet and the outlet are in fluid communication. The valve also comprises a pressure regulator valve that comprises a spring loaded poppet valve that includes a pressure regulator inlet that receives an inlet pressure which is regulated based upon force applied to a pressure regulator piston by a regulator spring to provide a regulated output pressure at a pressure regulator outlet that is in fluid communication with the piston first surface. A valve spring applies a force to the piston first surface to spring bias the bleed air valve to the open position. A solenoid valve receives a command signal and in response provides compressed air to a solenoid valve outlet that is in fluid communication with the pressure regulator inlet.

The solenoid valve may receive gas turbine engine compressor discharge pressure $P3$ such that when the solenoid valve receives the command signal to close the solenoid valve provides ambient pressure to the solenoid valve outlet.

The center guide may be axially aligned with the inlet and the outlet.

The pressure regulator valve may be integral with the housing.

Aspects of the disclosure are also directed to a bleed air valve that includes a housing, a piston, a pressure regulator valve and a control valve. The housing includes an inlet at a first end, an outlet at a second end, and a center portion between the inlet and the outlet to selectively provide a pneumatic flow path between the inlet and the outlet via a passage in the center portion. The piston moves along a center guide, where the piston includes a first piston surface and an opposing second piston surface, and the piston moves along the center guide in response to forces applied to the first piston surface and the second piston surface, where the piston is spring biased to an open position such that the inlet and the outlet are in fluid communication. The pressure regulator valve includes a spring loaded poppet valve comprising a pressure regulator inlet that receives an inlet pressure which is regulated based upon force applied to a pressure regular piston by a regulator spring to provide a regulated output pressure at a pressure regulator outlet that is in fluid communication with the piston first surface. The control valve receives a command signal and in response to a first condition of the command signal provides compressed air to a control valve output that is in fluid communication with the shuttle valve inlet, and in response to a second condition of the command signal provides ambient air to the control valve output.

The bleed air valve may also comprise a spring that applies a force to the second piston surface.

The control valve may comprise an electromechanical valve.

Aspects of the disclosure are further directed to an aircraft gas turbine engine bleed air valve that comprises a housing, a piston, a pressure regulator valve, an electromechanical valve, and a spring. The housing includes an inlet at a first end, an outlet at a second end, and a center portion between the inlet and the outlet to selectively provide a pneumatic flow path between the inlet and the outlet via a passage in the center portion. The piston axially moves along a center guide, where the piston includes a first piston surface and an opposing second piston surface, and the piston axially moves along the center guide in response to forces applied to the first piston surface and the second piston surface, where the piston is spring biased to an open position such that the inlet and the outlet are in fluid communication. The pressure regulator valve comprises a spring loaded poppet valve that includes a pressure regulator inlet that receives an inlet pressure which is regulated based upon force applied to a pressure regulator piston by a regulator spring to provide a regulated output pressure at a pressure regulator outlet that is in fluid communication with the piston first surface. The electromechanical valve selectively provides one of ambient air or compressed air to an electromechanical valve outlet that is in fluid communication with the shuttle valve inlet. The spring applies a force to the second piston surface to spring bias the bleed air valve to the open position to spring bias the aircraft gas turbine engine bleed air valve to the open position to bleed compressor air to ambient.

The electromechanical valve may receive gas turbine engine compressor discharge pressure $P3$ such that when the solenoid valve receives the command signal to close the solenoid valve provides ambient pressure to the solenoid valve outlet.

The center guide may be axially aligned with the inlet and the outlet.

The pressure regulator valve may be integral with the housing.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
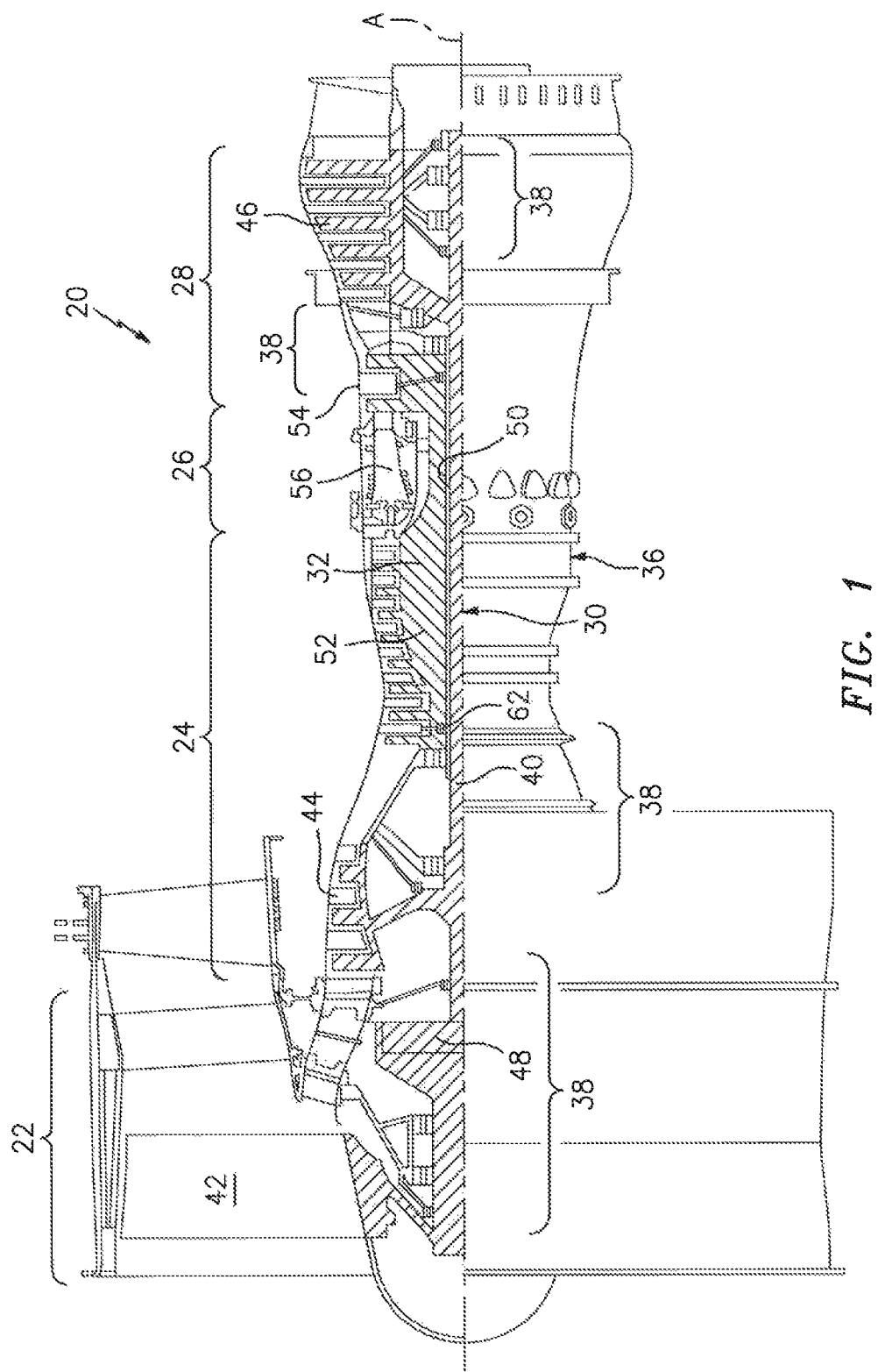
FIG. 1 is a schematic cross-section of an example gas turbine engine.

It is noted that various connections are set forth between elements in the following description and in the drawings (the contents of which are incorporated in this specification by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities or a space/gap between the entities that are being coupled to one another.

Aspects of the disclosure may be applied in connection with a gas turbine engine.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engines (not shown) might include an augmentor section among other systems or features. Although depicted as a high-bypass turbofan in the disclosed non-limiting embodiment, it should be appreciated that the concepts described herein are not limited to use only with turbofan architectures as the teachings may be applied to other types of turbine engines such as turbojets, turboshafts, industrial gas turbines, and three-spool (plus fan) turbofans with an intermediate spool, and geared turbo fans.

The engine 20 generally includes a low spool 30 and a high spool 32 mounted for rotation about an engine central longitudinal axis A relative to an engine case structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 may drive the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and a high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The LPT 46 and the HPT 54 rotationally drive the respective low spool 30 and high spool 32 in response to the expansion.

Figure 2:
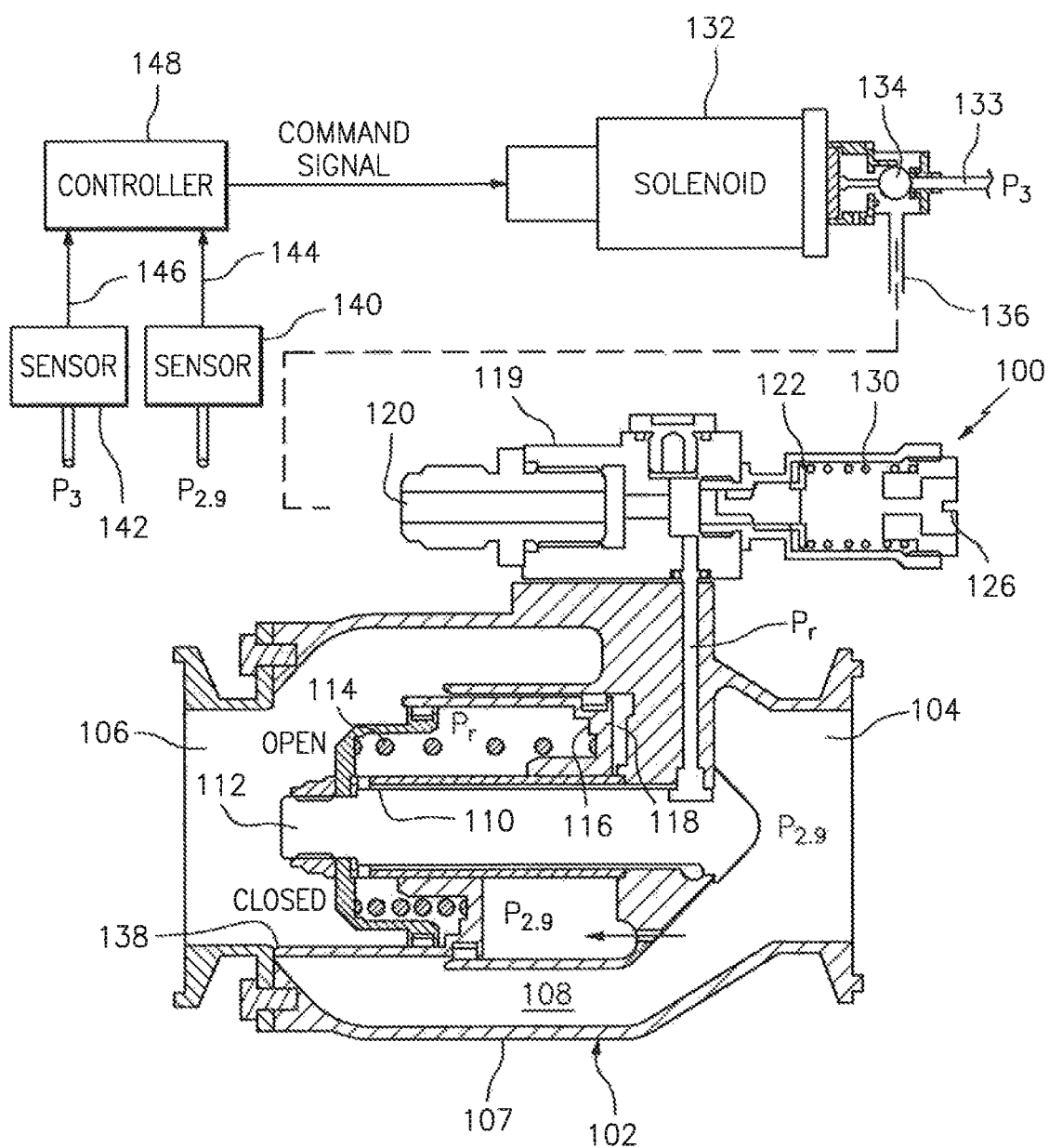
FIG. 2 is a schematic cross-section of an inline stability bleed valve.

FIG. 2 is a schematic cross-section of a stability bleed valve 100. In one embodiment the valve 100 may be a P2.9 stage bleed valve for a gas turbine engine. The valve 100 includes a housing 102, an air inlet 104, an air outlet 106 and a center portion 107 between the inlet and the outlet to selectively provide a pneumatic flow path between the inlet and the outlet. The valve 100 also includes a passage 108 that selectively connects the air inlet 104 and the air outlet 106 when the valve is in the open position.

The valve 100 includes a sleeve guide portion 110 supported on a center guide 112 with air pressure acting to close the airflow A through the valve 100 and a spring 114 acting to open the valve, with regulated pressure Pr nominally on a spring side 116 of a piston 118. Pr is a regulated pressure received from a pressure regulator 119 (e.g., a bleed off type gage pressure regulator). The pressure regulator 119 may include a spring loaded poppet valve having a pressure regulator inlet 120 that receives an inlet pressure, which is regulated based upon force applied to a piston 122 by the spring loaded poppet valve to nominally provide regulated output pressure Pr at pressure regulator output 124. The pressure regulator 119 may be adjustable. For example, the pressure value set point of the pressure regulator 119 may be adjusted via an adjustment screw 126 that changes the force exerted on the piston 122 by spring 130. This allows the user to control the nominal regulated output pressure Pr and thus when the valve 100 starts to close.

The pressure regulator inlet 120 is in fluid communication with a solenoid driven valve 132. The valve 132 includes a solenoid valve inlet restriction (Asup) 133 that receives a pneumatic flow tapped from the compressor, for example at compressor location P3. When the solenoid is energized a solenoid ball valve 134 is positioned to close the solenoid valve inlet 133. As a result, ambient air is provided to the pressure regulator inlet 120 via solenoid valve outlet 136, rather than P3. If ambient air is provided to the pressure regulator inlet 120, the pressure regulator output is set to ambient and thus pressure Pr acting on the spring side 116 of the piston 118 is equal to ambient.

When the solenoid 132 is not energized the solenoid ball valve 134 is positioned to provide P3 at the solenoid valve outlet 136 and thus the pressure regulator inlet 120 receives P3 via the solenoid valve outlet 136. When the pressure P2.9 at the valve inlet 104 goes above regulated pressure Pr provided by the pressure regulator 119 the valve 100 closes (i.e., piston 118 contacts seat 138).

The valve 100 is spring biased to the full open position so the inlet 104 is in pneumatic connection with the outlet 106 via the passage 108. As the engine starts and compressor pressure P3 increases, and the solenoid is not energized, the valve 100 remains open until a prescribed compressor pressure is reached. The set point to initiate closure is dependent upon known factors such as the preload of the spring 114 and the pressure regulator output pressure Pr. As the compressor pressure P2.9 increases the valve 100 closes when the force applied to the piston 118 by P2.9 exceeds the sum of the forces applied by the spring 114 and the pressure Pr acting on the spring side 116 of the piston 118. The valve 100 is fully closed when the piston sleeve 110 hits the seat 138.

To prevent excessively hot P3 bleed leakage overboard through the regulator the solenoid 126 may be energized when pressure P2.9 is greater than a P2.9 upper limit value, or similarly when pressure P3 is greater than a P3 upper limit value. Sensors 140, 142 may sense pressures P2.9 and P3 respectively and provide sensed signals indicative thereof on lines 144, 146 to controller 148. The controller can compare one or more of these measured pressure values against respective thresholds to determine whether or not to energize the solenoid 132 to close the valve 100. The solenoid 126 may command the valve 100 closed at any time the engine is operating. Commanding the solenoid to close the valve 100 prevents leakage flow from the inlet 104 to the outlet 106.

In the event of an electrical failure and loss of ability to command the valve 100 closed via the solenoid 126, the valve 100 still has the inherent (passive) capability to close as pressure at the inlet 104 increases above the adjustable regulated pressure value.

Figure 3:
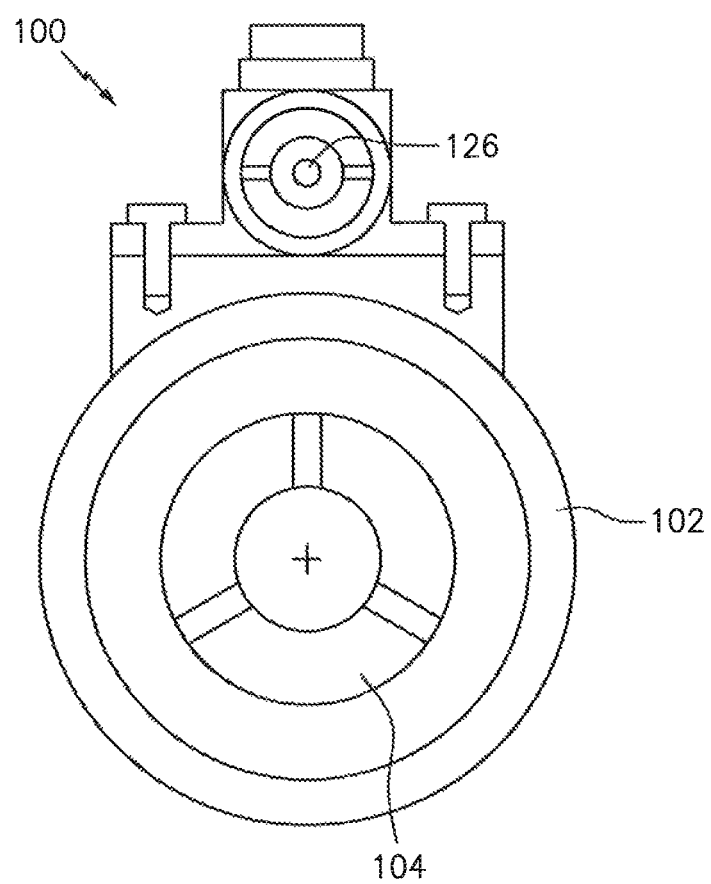
FIG. 3 is a side view of the inline stability bleed valve of FIG. 3.

FIG. 3 is a side view of the valve 100 looking into the inlet 104.

It is contemplated that the valve casing include a bolt on manifold housing. The inlet flange may be threaded on rather than bolted on. In addition, the valve piston may ride on a carbon bushing. The valve piston may include a multi grooved series of labyrinth grooves on its guide surface to prevent leakage. The solenoid may be mounted on the valve.

The valve 100 provides both passive and active modes of operation. Active mode is when the solenoid is energized in order to apply ambient pressure to the pressure regular valve inlet 120. The passive shutoff (i.e., closing the valve) and active shutoff of the valve 100 prevents excess system flow.

It should be understood that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed in the illustrated embodiment, other arrangements will benefit herefrom.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A bleed air valve, comprising:
a housing that includes an inlet at a first end, an outlet at a second end, and a center portion between the inlet and the outlet to selectively provide a pneumatic flow path between the inlet and the outlet via a passage in the center portion;
a piston that moves along a center guide, where the piston includes a first piston surface and an opposing second piston surface, and the piston moves along the center guide in response to forces applied to the first piston surface and the second piston surface, where the piston is spring biased to an open position such that the inlet and the outlet are in fluid communication;
a pressure regulator valve that comprises a spring loaded poppet valve that includes a pressure regulator inlet that receives an inlet pressure which is regulated based upon force applied to a pressure regulator piston by a regulator spring to provide a regulated output pressure at a pressure regulator outlet that is in fluid communication with the piston first surface;
a valve spring that applies a force to the first piston surface to spring bias the bleed air valve to the open position; and
a solenoid valve that receives a command signal and in response provides compressed air to the pressure regulator inlet via a solenoid valve outlet that is in fluid communication with the pressure regulator inlet.

2. The bleed air valve of claim 1, where the solenoid valve receives gas turbine engine compressor discharge pressure P3 such that when the solenoid valve receives the command signal to close the solenoid valve provides ambient pressure to the solenoid valve outlet.

3. The bleed air valve of claim 1, where the center guide is axially aligned with the inlet and the outlet.

4. The bleed air valve of claim 1, where the pressure regulator valve is integral with the housing.

5. The bleed air valve of claim 1, wherein the solenoid valve is operable between an energized condition and a deenergized condition and wherein, in the energized condition, the solenoid valve is closed so as to provide ambient air pressure to the pressure regulator inlet.

6. The bleed air valve of claim 5, wherein, in the deenergized condition, the solenoid valve is open so as to provide compressor discharge pressure (P3) to the pressure regulator inlet.

7. The bleed air valve of claim 1, further comprising an aperture extending through the housing, the aperture providing bleed air valve inlet pressure (P2.9) to the second piston surface.

8. A bleed air valve, comprising:
a housing that includes an inlet at a first end, an outlet at a second end, and a center portion between the inlet and the outlet to selectively provide a pneumatic flow path between the inlet and the outlet via a passage in the center portion;
a piston that moves along a center guide, where the piston includes a first piston surface and an opposing second piston surface, and the piston moves along the center guide in response to forces applied to the first piston surface and the second piston surface, where the piston is spring biased to an open position such that the inlet and the outlet are in fluid communication;
a pressure regulator valve that includes a spring loaded poppet valve comprising a pressure regulator inlet that receives an inlet pressure which is regulated based upon force applied to a pressure regular piston by a regulator spring to provide a regulated output pressure at a pressure regulator outlet that is in fluid communication with the first piston surface; and
a control valve that receives a command signal and in response to a first condition of the command signal provides compressed air to the pressure regulator inlet via a control valve output that is in fluid communication with the pressure regulator inlet, and in response to a second condition of the command signal provides ambient air to the pressure regulator inlet via the control valve output.

9. The bleed air valve of claim 8, further comprising a spring that applies a force to the first piston surface.

10. The bleed air valve of claim 8, where the control valve comprises an electromechanical valve.

11. An aircraft gas turbine engine bleed air valve, comprising:
- a housing that includes an inlet at a first end, an outlet at a second end, and a center portion between the inlet and the outlet to selectively provide a pneumatic flow path between the inlet and the outlet via a passage in the center portion;
- a piston that axially moves along a center guide, where the piston includes a first piston surface and an opposing second piston surface, and the piston axially moves along the center guide in response to forces applied to the first piston surface and the second piston surface, where the piston is spring biased to an open position such that the inlet and the outlet are in fluid communication;
- a pressure regulator valve that comprises a spring loaded poppet valve that includes a pressure regulator inlet that receives an inlet pressure which is regulated based upon force applied to a pressure regulator piston by a regulator spring to provide a regulated output pressure at a pressure regulator outlet that is in fluid communication with the piston first surface;
- an electromechanical valve that selectively provides one of ambient air or compressed air to the pressure regulator inlet via an electromechanical valve outlet that is in fluid communication with the pressure regulator inlet; and
- a spring that applies a force to the first piston surface to spring bias the aircraft gas turbine engine bleed air valve to the open position to bleed compressor air to ambient.

12. The aircraft gas turbine engine bleed valve of claim 11, where the electromechanical valve receives gas turbine engine compressor discharge pressure (P3) and when the electromechanical valve receives a command signal to close the electromechanical valve provides ambient pressure to the electromechanical valve outlet.

13. The aircraft gas turbine engine bleed valve of claim 11, where the center guide is axially aligned with the inlet and the outlet.

14. The aircraft gas turbine engine bleed valve of claim 11, where the pressure regulator is integral with the housing.

* * * * *